(12) United States Patent
Fujita

(10) Patent No.: US 8,248,224 B2
(45) Date of Patent: Aug. 21, 2012

(54) APPARATUS, METHOD, AND PROGRAM FOR DETECTING DECREASE IN TIRE AIR PRESSURE BY CALCULATING THE SUM OF WHEEL SPEEDS

(75) Inventor: Hajime Fujita, Nishinomiya (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 30 days.

(21) Appl. No.: 12/960,602

(22) Filed: Dec. 6, 2010

(65) Prior Publication Data

US 2011/0260849 A1 Oct. 27, 2011

(30) Foreign Application Priority Data

Apr. 23, 2010 (JP) ................. 2010-100022

(51) Int. Cl.
*G08B 21/00* (2006.01)
(52) U.S. Cl. ........... 340/444; 340/442; 73/146.2
(58) Field of Classification Search .......... 340/442–444; 73/146.2–146.5
See application file for complete search history.

(56) References Cited

U.S. PATENT DOCUMENTS

2002/0178823 A1* 12/2002 Inoue ............................... 73/702
2007/0139179 A1* 6/2007 Yanase ......................... 340/443

FOREIGN PATENT DOCUMENTS

JP 2005-53263 A 3/2005

* cited by examiner

*Primary Examiner* — Jeffery Hofsass
(74) *Attorney, Agent, or Firm* — Birch, Stewart, Kolasch & Birch, LLP

(57) ABSTRACT

An apparatus for detecting a decrease in a tire air pressure includes: a rotation information detection means for periodically detecting tire rotation information regarding the respective wheels of a four-wheel vehicle; a wheel speed calculation means for calculating tire wheel speeds based on the rotation information; a comparison value calculation means for calculating a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value; a determination means for determining a tire having a decreased pressure; and an alarming means. The apparatus further includes a conversion means for converting the first comparison value and the second comparison value to a plane for which change amounts of the first comparison value and the second comparison value due to a decreased pressure from the normal value learnt during a time of a normal pressure are unified between front wheels and rear wheels, and the determination means is so configured as to perform a decreased pressure determination by a single determination threshold value.

9 Claims, 6 Drawing Sheets

1: Wheel Speed Detection Means
2: Control Unit
3: Display Unit
4: Initialization Button
5: Alarm Unit

APPARATUS, METHOD, AND PROGRAM FOR DETECTING DECREASE IN TIRE AIR PRESSURE BY CALCULATING THE SUM OF WHEEL SPEEDS

TECHNICAL FIELD

The present invention relates to a method of detecting a decrease in a tire air pressure and a program for detecting a decrease in a tire air pressure characterized in that, in a tire air pressure alarming system for detecting a tire having a decreased air pressure based on wheel speed comparison values, the comparison values are subjected to a linear transformation so that a single decreased pressure sensitivity can be used for front wheels and rear wheels to thereby provide the detection of a decreased pressure by a single determination threshold value.

BACKGROUND ART

Factors for allowing an automobile to run safely can include a tire air pressure. An air pressure lower than an appropriate value may deteriorate a stable operation or fuel consumption and cause a tire burst. Thus, a tire air pressure alarm system for detecting a decreased tire air pressure to issue an alarm to a driver to prompt an appropriate procedure is an important technique from the viewpoints of environment protection and driver safety.

Conventional alarm system can be classified into a direct detection type and an indirect detection type. The direct detection type alarm apparatus includes a pressure sensor provided in a tire wheel to directly measure a tire air pressure. Although the direct detection type alarm apparatus can accurately detect a decreased air pressure, the apparatus has technical and cost disadvantages because the apparatus has a problem in the fault-tolerant performance in an actual environment and requires a high-cost sensing system for example.

On the other hand, the indirect detection is a method of estimating air pressures based on the rotation information of the respective wheels. The indirect detection can be further classified into the dynamic loaded radius method and the resonance frequency method. Among these methods, the dynamic loaded radius method applied in the present invention uses a phenomenon in which a tire having a decreased pressure is rotated at a higher speed than a tire having a normal pressure. The dynamic loaded radius method compares the rotation speeds of four tires of a vehicle to thereby detect a decreased pressure. Specifically, it is assumed that wheels at diagonal positions to each other are in a pair and a value of wheel speed comparison between two pairs is DEL1, a wheel speed comparison value between front wheels and rear wheels is DEL2, and a wheel speed comparison value between left wheels and right wheels is DEL3 (these values will be collectively referred to hereinafter as "DEL value"). When these comparison values reach a predetermined abnormal value, alarm is issued (see Patent Literature 1). This method can provide a simple calculation processing only based on wheel rotation speed signals obtained from wheel speed sensors. Thus, attention has been focused on this method as a low-cost detection system.

CITATION LIST

Patent Literature

Patent Literature 1: Japanese Unexamined Patent Publication No. 2005-53263

SUMMARY OF INVENTION

Technical Problem

When a driving force is applied to a wheel, slip occurs to cause the instantaneous slip of the wheel to cause an increased rotation speed. Thus, the driving wheel has a higher rotation speed than that of the driven wheel. Furthermore, when a tire has a decreased pressure, the area at which the tire contacts with the road surface is increased to thereby cause a decreased slip rate, thus cancelling an increased wheel speed due to a decreased dynamic loaded radius. Due to the influence as described above, the driving wheel has a lower decreased pressure sensitivity (which shows a change amount of the DEL value due to a decreased pressure from a calibration value learnt during a time of a normal pressure) than that of the driven wheels.

FIG. 3 is a two-dimensional plane when the DEL1 value in the front-wheel drive vehicle is taken along the horizontal axis and the DEL3 value is taken along the vertical axis. When left front wheel (FL) has a decreased pressure, the estimate value $x=(d_1, d_3)'$ appears in the first quadrant in the plane. When the left rear wheel (RL) has a decreased pressure, the estimate value is in the second quadrant. When the right front wheel (FR) has a decreased pressure, the estimate value is in the third quadrant. When the right rear wheel (RR) has a decreased pressure, the estimate value is in the fourth quadrant. Here, $d_1$ shows the DEL1 value and $d_3$ shows the DEL3 value and "'" shows the transposition of the vector and matrix.

Since the decreased pressure sensitivity m of the driving wheel is different from the decreased pressure sensitivity n of the driven wheel (such difference is shown in FIG. 3 as a difference in the distance from the origin to the respective points), the optimal threshold value for DEL1 is different. Thus, it is required to identify the position of the wheel having a decreased pressure based on the quadrant in which "x" exists and to selectively use a plurality of different determination threshold values depending on the situation. However, when "x" varies due to a change of the running conditions (e.g., the vehicle turning, acceleration and deceleration, or an eccentric load), some decreased pressure status causes the respective resultant values of "x" to cross quadrant boundaries to thereby cause a rapid change in the threshold value that should be referred to. This consequently causes an adverse effect of an unstable result of the determination of a decreased pressure. If the decreased pressure determination is suspended until the position identification is stable in order to avoid the above adverse effect, another problem is caused where quick estimation is suppressed and thus a sudden puncture cannot be handled. Furthermore, the multi-stage procedure as described above causes the decreased pressure determination procedure to be complicated, thus increasing man hours required for the implementation and the performance evaluation. In order to avoid the difficulties as described above, a method is considered where an average of the respective optimal determination threshold values of the driving wheel and the driven wheel is used as a common threshold value. However, the gap from the optimal value sacrifices the detection accuracy, which may cause a false alarm or no alarm.

In order to solve the problems as described above, it is an objective of the present invention to carry out the decreased pressure determination by a single determination threshold value without requiring identification of a decreased pressure wheel position. The present invention provides an apparatus, a method, and a program for detecting a decrease in a tire air pressure characterized in that a common optimal determination threshold value is used.

Solution to Problem (1) In accordance with the present invention, there is provided an apparatus for detecting a decrease in a tire air pressure (hereinafter also referred to as "detection apparatus") comprising:

a rotation information detection means for periodically detecting tire rotation information regarding the respective wheels of a four-wheel vehicle;

a wheel speed calculation means for calculating tire wheel speeds based on the rotation information detected by the rotation information detection means;

a comparison value calculation means for calculating a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value;

a determination means for determining a tire having a decreased pressure based on a relation between the first comparison value and/or the second comparison value and a predetermined determination threshold value; and an alarming means for issuing an alarm when the determination means determines a tire having a decreased pressure, wherein the apparatus further comprises a conversion means for converting the first comparison value and the second comparison value to a plane for which change amounts of the first comparison value and the second comparison value due to a decreased pressure from the normal value learnt during a time of a normal pressure (hereinafter referred to as "decreased pressure sensitivity") are unified between front wheels and rear wheels, and the determination means is so configured as to perform a decreased pressure determination by a single determination threshold value.

In the detection apparatus of the present invention, in order to determine a tire having a decreased air pressure in a four-wheel vehicle (including all of a front-wheel drive vehicle, a rear-wheel drive vehicle, and a four-wheel drive vehicle), the conversion means is used to convert the first comparison value and the second comparison value to a plane for which a decreased pressure sensitivity is unified with regard to front wheels and rear wheels. A decreased pressure detection by a single determination threshold value is enabled by unifying the decreased pressure sensitivity between the front wheels and the rear wheels, thus providing a stable decreased pressure determination by a simple procedure.

(2) In the detection apparatus of (1), in the two-dimensional plane in which the first comparison value is taken along the horizontal axis as DEL1 and the second comparison value is taken along the vertical axis as DEL3, the conversion means can subject the calculated estimate value (DEL1, DEL3) to a linear transformation so that the values are symmetric to the respective axes, thereby eliminating the difference in the decreased pressure sensitivity between the front wheels and the rear wheels.

(3) In the detection apparatus of (2), the conversion means can obtain a corrected estimate value by multiplying the estimate value with a matrix for rotating the estimate value in either of a clockwise direction or a counterclockwise direction by $\pi/4$, a matrix for unifying different decreased pressure sensitivities by elongating or contracting in a horizontal axis direction and a vertical axis direction, and a matrix for rotating the estimate value in the other direction of a clockwise direction or a counterclockwise direction by $\pi/4$.

(4) In accordance with the present invention, there is also provided a method of detecting a decrease in a tire air pressure comprising:

a rotation information detection step for periodically detecting tire rotation information regarding the respective wheels of a four-wheel vehicle;

a wheel speed calculation step for calculating tire wheel speeds based on the rotation information detected by the rotation information detection step;

a comparison value calculation step for calculating a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value;

a determination step for determining a tire having a decreased pressure based on a relation between the first comparison value and/or the second comparison value and a predetermined determination threshold value; and an alarming step for issuing an alarm when the determination step determines a tire having a decreased pressure, wherein the method further comprises a conversion step for converting the first comparison value and the second comparison value to a plane for which change amounts of the first comparison value and the second comparison value due to a decreased pressure from the normal value learnt during a time of a normal pressure are unified between front wheels and rear wheels, and the determination step performs a decreased pressure determination by a single determination threshold value.

(5) In accordance with the present invention, there is further provided a program for detecting a decrease in a tire air pressure which causes, in order to detect a tire having a decreased air pressure attached to a four-wheel vehicle, a computer to function as:

a wheel speed calculation means for calculating tire wheel speeds based on rotation information detected by a rotation information detection means for periodically detecting tire rotation information regarding the respective wheels of a four-wheel vehicle;

a comparison value calculation means for calculating a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value;

a determination means for determining a tire having a decreased pressure based on a relation between the first comparison value and/or the second comparison value and a predetermined determination threshold value; and a conversion means for converting the first comparison value and the second comparison value to a plane for which change amounts of the first comparison value and the second comparison value due to a decreased pressure from the normal value learnt during a time of a normal pressure are unified between front wheels and rear wheels, wherein the determination means is so configured as to perform a decreased pressure determination by a single determination threshold value.

Advantageous Effects of Invention

According to an apparatus, a method, and a program for detecting a decrease in a tire air pressure of the present invention, by using a common optimal determination threshold value, a decreased pressure determination can be carried out by a single determination threshold value without identifying a decreased pressure wheel position.

DESCRIPTION OF EMBODIMENTS

Hereinafter, with reference to the attached drawings, an embodiment of a detection apparatus and method, and a program for detecting a decrease in tire air pressure of the present invention will be described in detail.

Figure 1:
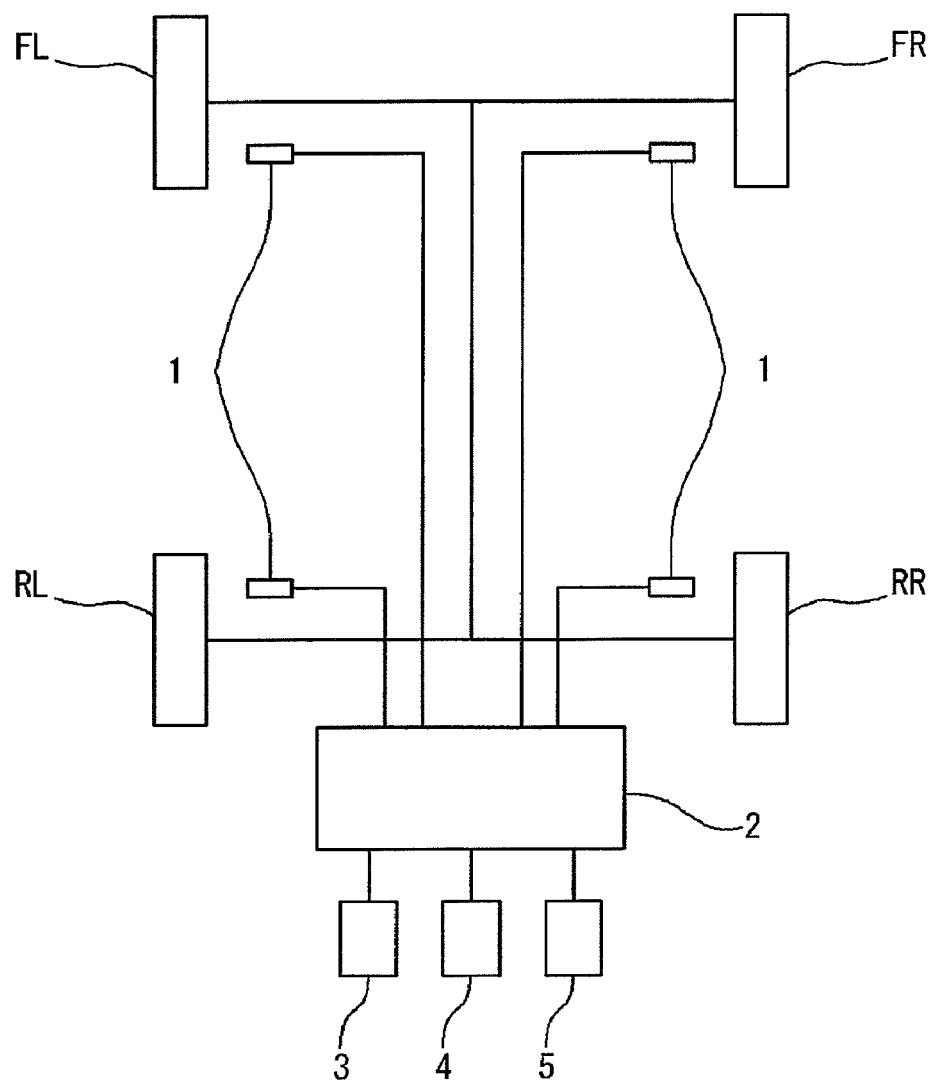
FIG. 1 is a block diagram illustrating one embodiment of an apparatus for detecting a decrease in a tire air pressure of the present invention.

As shown in FIG. 1, a detection apparatus according to one embodiment of the present invention includes, in order to detect the rotation speed of four tires of a left front wheel (FL), a right front wheel (FR), a left rear wheel (RL), and a right rear wheel (RR) provided in a four-wheel vehicle, a normal wheel speed detection means (rotation information detection means) 1 provided to be associated with the respective tires. It is noted that the vehicle in the present embodiment is a front wheel-drive vehicle.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as a one that generates power using rotation as in a dynamo to measure an angular velocity and a wheel speed based on the voltage of the generated power. The output from the wheel speed detection means 1 is given to a control unit 2 that is a computer such as ABS. Connected to the control unit 2 are a display unit 3 comprising a liquid crystal display element, a plasma display element or CRT for example for displaying a tire having a decreased pressure; an initialization button 4 that can be operated by a driver; and an alarm unit 5 for notifying a driver of a tire having a decreased pressure.

Figure 2:
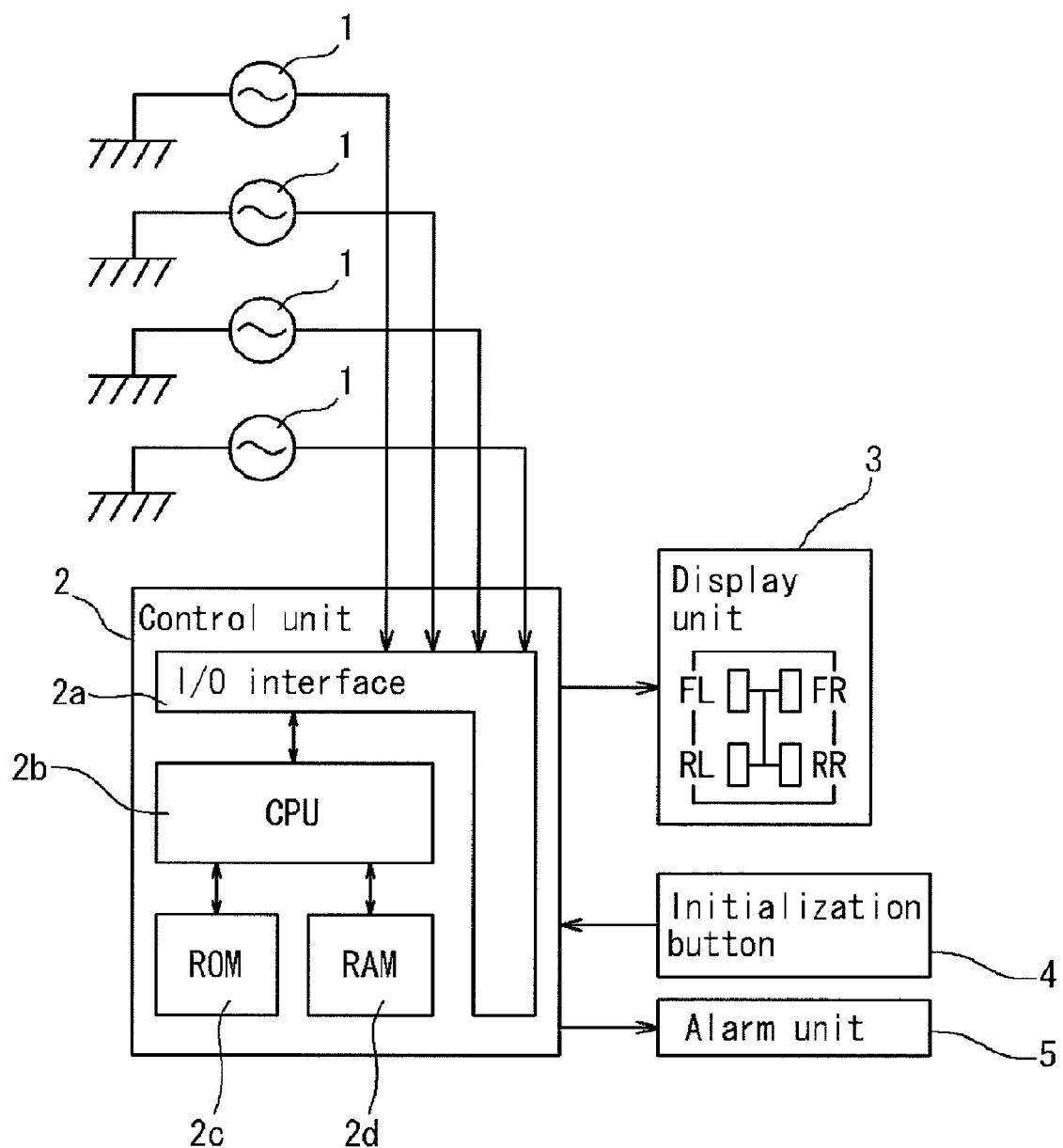
FIG. 2 is a block diagram illustrating an electric configuration of the apparatus for detecting a decrease in a tire air pressure shown in FIG. 1.

As shown in FIG. 2, the control unit 2 comprises: an I/O interface 2a required for the exchange of a signal with an external apparatus; a CPU 2b functioning as a computation processing center; a ROM 2c storing therein a control operation program of the CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, the angular velocities of the respective tires at every predetermined sampling cycle $\Delta T$ (sec) (e.g., $\Delta T = 0.05$ second).

The detection apparatus according to the present embodiment comprises: the wheel speed detection means 1 (rotation information detection means) for periodically detecting tire rotation information regarding the respective wheels of a four-wheel vehicle; a wheel speed calculation means for calculating tire wheel speeds based on the rotation information detected by the wheel speed detection means 1; a comparison value calculation means for calculating a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value; a determination means for determining a tire having a decreased pressure based on a relation between the first comparison value and/or the second comparison value and a predetermined determination threshold value; an alarming means for issuing an alarm when the determination means determines a tire having a decreased pressure; and a conversion means for converting the first comparison value and the second comparison value to a plane for which change amounts of the first comparison value and the second comparison value due to a decreased pressure from the normal value learnt during a time of a normal pressure are unified between front wheels (driving wheels) and rear wheels (driven wheels). The determination means is so configured as to perform a decreased pressure determination by a single determination threshold value. A program for detecting a tire having a decreased air pressure causes the control unit 2 to function as the wheel speed calculation means, the comparison value calculation means, the determination means, and the conversion means.

In the present invention, based on the tire wheel speeds calculated from the rotation information detected by the wheel speed detection means 1, a difference between a sum of wheel speeds of two wheels at one diagonal positions and a sum of wheel speeds of two wheels at the other diagonal positions is calculated as the first comparison value DEL1. Also, a difference between a sum of wheel speeds of two wheels at one same side positions and a sum of wheel speeds of two wheels at the other same side positions is calculated as the second comparison value DEL3.

The values $d_1$ and $d_3$ of DEL1 and DEL3 can be calculated as in the conventional technique by the following formulae for example.

$$d_1 = \frac{v_{FL} + v_{RR}}{v_{FR} + v_{RL}} - 1$$

$$d_3 = \frac{v_{FL} + v_{RL}}{v_{FR} + v_{RR}} - 1$$

In the formulae, $v_{FL}$, $v_{FR}$, $v_{RL}$, and $v_{RR}$ represent the wheel speeds of FL, FR, RL, and RR, respectively.

In the present invention, the resultant estimate value x ($d_1$, $d_3$) is subjected to a linear transformation so that the value is symmetric with regard to the respective axes, thus eliminating the difference in the decreased pressure sensitivity between the front wheels (driving wheels) and the rear wheels (driven wheels). The matrix A for rotating "x" in the counterclockwise direction by $\pi/4$ and the matrix W for elongating or contracting the decreased pressure sensitivities in the DEL1 axis direction and the DEL3 axis direction for unifying different decreased pressure sensitivities are represented by the following formulae.

$$A = \begin{pmatrix} \cos\frac{\pi}{4} & -\sin\frac{\pi}{4} \\ \sin\frac{\pi}{4} & \cos\frac{\pi}{4} \end{pmatrix} = \frac{1}{\sqrt{2}}\begin{pmatrix} 1 & -1 \\ 1 & 1 \end{pmatrix}$$

$$W = \begin{pmatrix} \frac{m+n}{2m} & 0 \\ 0 & \frac{m+n}{2n} \end{pmatrix}$$

Then, the corrected data $\hat{x}$ can be calculated by the following formula.

$$\hat{x} = AWA'x$$

Figure 3:
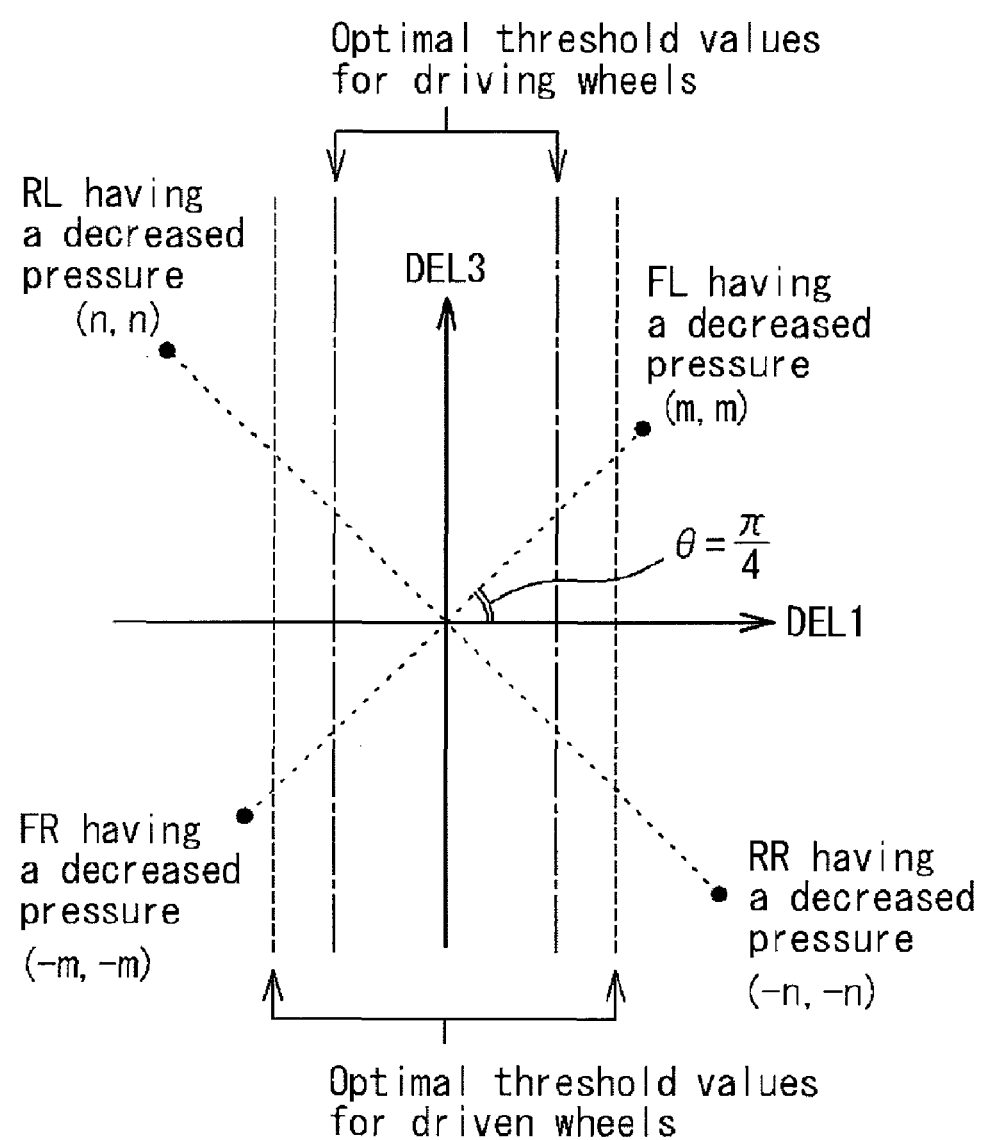
FIG. 3 is a two-dimensional plane in which the value DEL1 is taken along the horizontal axis and the value DEL3 is taken along the vertical axis in front-wheel drive vehicle.
Figure 4:
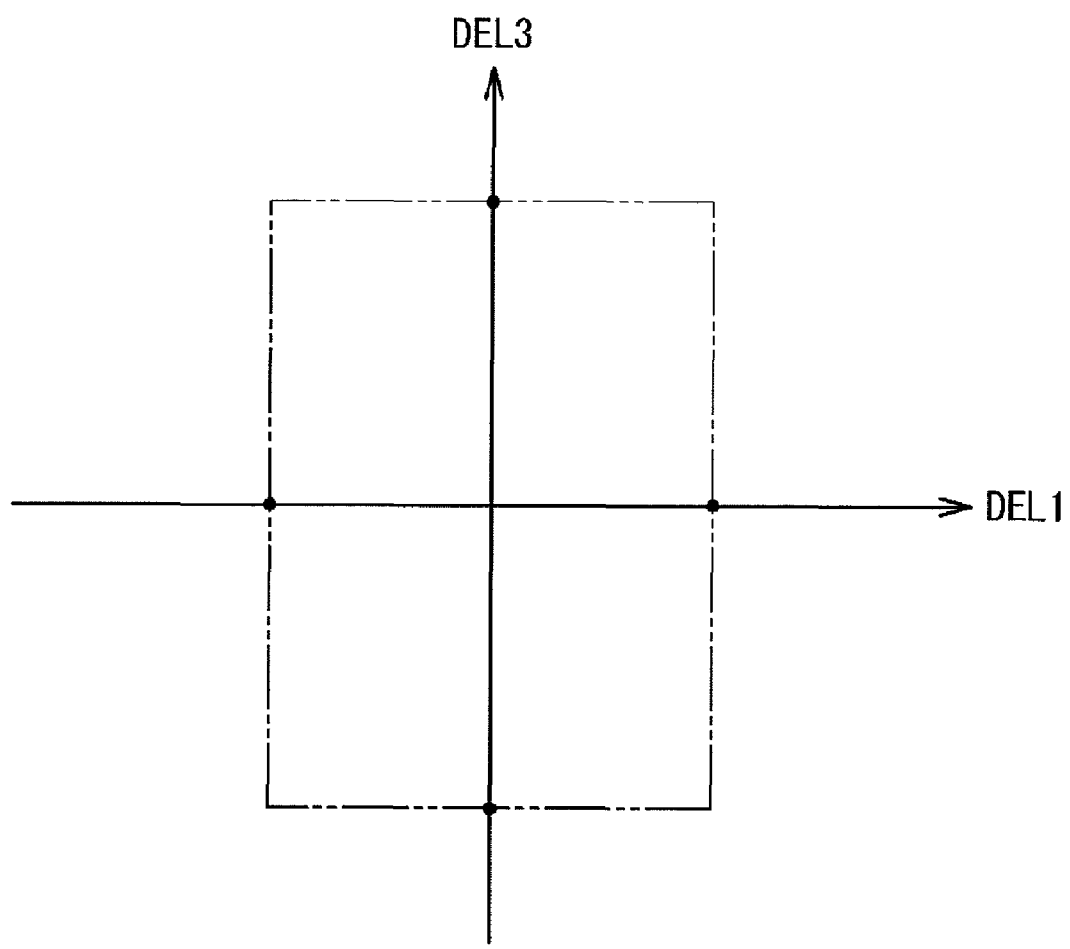
FIG. 4 illustrates the respective points shown in FIG. 3 rotated in a clockwise direction by $\pi/4$.
Figure 5:
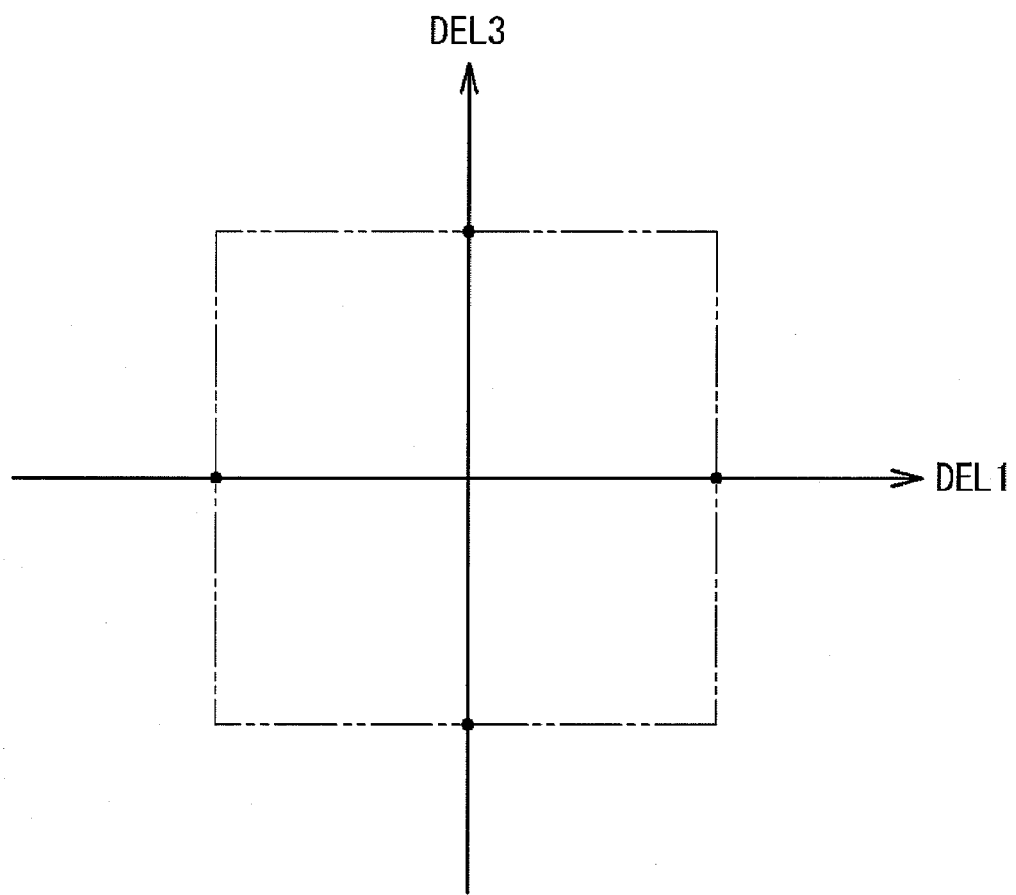
FIG. 5 illustrates a rectangle for which the respective sides are elongated or contracted so that the distances between the origin and the respective points shown in FIG. 4 take an average value of the driving wheels and driven wheels.
Figure 6:
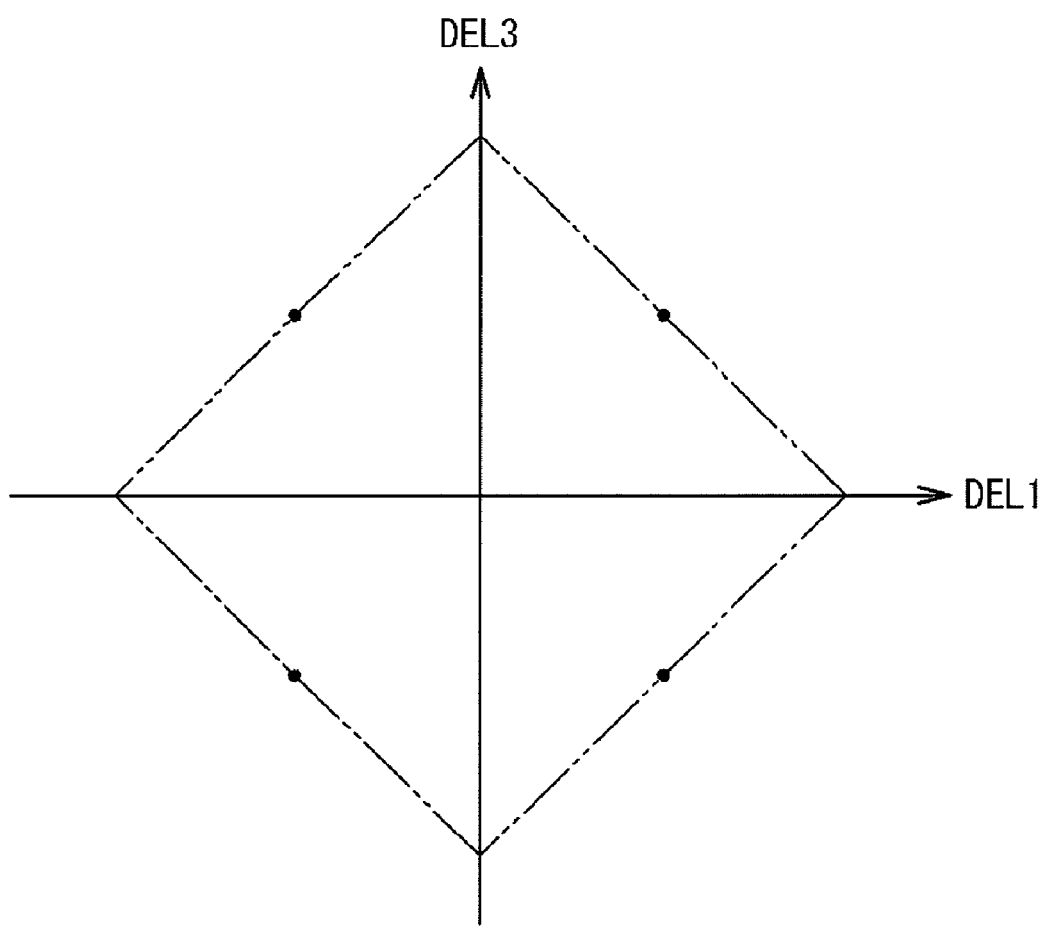
FIG. 6 illustrates the respective points shown in FIG. 5 rotated in a counterclockwise direction by $\pi/4$.

Specifically, by firstly multiplying A' with "x", "x" is rotated in the clockwise direction by $\pi/4$ so that the respective points in FIG. 3 (points showing FL, RL, FR, and RR having a decreased pressure) are positioned on the axis of DEL1 or DEL3 (see FIG. 4) to subsequently multiply the resultant value with W, the respective sides of the rectangle are elongated or contracted so that the distance between the respective points and the origin (i.e., the decreased pressure sensitivity) takes an average value of the driving wheels and the driven wheels (m+n)/2 (see FIG. 5). Finally, the resultant value is multiplied with A and is rotated in the counterclockwise direction by $\pi/4$ to return to the original positional relation (see FIG. 6). AWA' left-multiplied with x may be calculated in advance and may be retained in a memory as a constant and can be represented by the following formula.

$$AWA' = \frac{1}{4mn}\begin{pmatrix} (m+n)^2 & n^2 - m^2 \\ n^2 - m^2 & (m+n)^2 \end{pmatrix}$$

Consequently, the corrected data x can be calculated by the following formula.

$$\hat{x} = \begin{pmatrix} \hat{d}_1 \\ \hat{d}_3 \end{pmatrix} = \frac{1}{4mn}\begin{pmatrix} d_1(m+n)^2 + d_3(n^2 - m^2) \\ d_1(n^2 - m^2) + d_3(m+n)^2 \end{pmatrix}$$

Therefore, based on the values m and n determined in advance, the respective values of 4 nm, $(m+n)^2$, and $n^2-m^2$ may be calculated and may be retained in the memory. Generally, m and n both take values of about 0.1. Thus, the above calculation is very simple.

When the corrected data $\hat{x}$ is obtained, a value (m+n)/4 obtained by halving the decreased pressure sensitivity (m+n)/2 for example can be used as a common determination threshold value to $\hat{d}_1$ for the driving wheels and the driven wheels. Specifically, a decreased pressure determination method can be configured so that, when $\hat{d}_1$ exceeds (m+n)/4, an alarm is issued to notify that a decreased pressure is detected. The decreased pressure determination method also can be configured to issue an alarm to notify that a decreased pressure is detected when $\hat{d}_1$ and $\hat{d}_3$ both exceed (m+n)/4. The above determination threshold value is illustrative and an optimal determination threshold value depends on a vehicle or tire characteristics. Thus, in an actual case, the optimal value is determined based on the result of an actual vehicle experiment for example.

With regard to the effect of the present invention, a case is considered where m=0.08 and n=0.12 are established for example. In the case of the conventional method, the position of a wheel having a decreased pressure must be identified based on the quadrant in which x exists to subsequently use a plurality of different determination threshold values depending on the situation. However, when $d_1$ has a value in the vicinity of the middle of a threshold value of driving wheels and a threshold value of driven wheels and $d_3$ has a value smaller than the estimation variance thereof, the variation of $d_3$ causes, whenever x is obtained, a discontinuous change of a threshold value to be referred to between the threshold value of the driving wheels and the threshold value of the driven wheels, thus causing an unstable result of the decreased pressure determination. In order to avoid such an unstable result, when the decreased pressure determination is waited until the position identification is stable, quick estimation is hindered, thus failing to cope with a sudden puncture.

On the other hand, when the present invention is used to correct x to thereby use a common decreased pressure sensitivity for driving wheels and driven wheels of (0.08+0.12)/2, there is no need to use different threshold values, thus preventing the above-described problem. Furthermore, the classification treatment in implementation is not required in order to use different threshold values. This can consequently simplify the decreased pressure determination algorithm to thereby reduce man hours required for the implementation and performance evaluation. The correction can be achieved by a very simple calculation, thus providing a higher effect when compared with a required calculation amount.

In the above-described embodiment, the calculated estimate value x is firstly rotated in the clockwise direction by $\pi/4$ and is finally rotated in the counterclockwise direction by $\pi/4$. However, the rotation may be performed in an opposite order. That is, the calculated estimate value x may be firstly rotated in the counterclockwise direction by $\pi/4$, the respective sides of the rectangle may be elongated or contracted, and the value may be finally rotated in the clockwise direction by $\pi/4$. In this case, the matrix W' elongating or contracting the respective sides of the rectangle in the axial direction of DEL1 and the axial direction of DEL3 is represented by the following formula.

$$W' = \begin{pmatrix} \frac{m+n}{2n} & 0 \\ 0 & \frac{m+n}{2m} \end{pmatrix}$$

What is claimed is:

1. An apparatus for detecting a decrease in a tire air pressure, comprising:
   a rotation information detection unit configured to periodically detect tire rotation information regarding the respective wheels of a four-wheel vehicle;
   a wheel speed calculation unit configured to calculate tire wheel speeds based on the rotation information detected by the rotation information detection unit;
   a comparison value calculation unit configured to calculate a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value;

a determination unit configured to determine a tire having a decreased pressure based on a relation between the first comparison value and/or the second comparison value and a predetermined determination threshold value; and an alarming unit configured to issue an alarm when the determination unit determines a tire having a decreased pressure, wherein the apparatus further comprises a conversion unit configured to convert the first comparison value and the second comparison value to a plane for which change amounts of the first comparison value and the second comparison value due to a decreased pressure from the normal value learnt during a time of a normal pressure are unified between front wheels and rear wheels, and the determination unit is so configured as to perform a decreased pressure determination by a single determination threshold value.

2. The apparatus for detecting a decrease in a tire air pressure according to claim 1, wherein, in the two-dimensional plane in which the first comparison value is taken along the horizontal axis as DEL1 and the second comparison value is taken along the vertical axis as DEL3, the conversion unit subjects the calculated estimate value (DEL1, DEL3) to a linear transformation so that the values are symmetric to the respective axes, thereby eliminating the difference in the decreased pressure sensitivity between the front wheels and the rear wheels.

3. The apparatus for detecting a decrease in a tire air pressure according to claim 2, wherein the conversion unit obtains a corrected estimate value by multiplying the estimate value with a matrix for rotating the estimate value in either of a clockwise direction or a counterclockwise direction by $\pi/4$, a matrix for unifying different decreased pressure sensitivities by elongating or contracting in a horizontal axis direction and a vertical axis direction, and a matrix for rotating the estimate value in the other direction of a clockwise direction or a counterclockwise direction by $\pi/4$.

4. A method of detecting a decrease in a tire air pressure, comprising:

a rotation information detection step for periodically detecting tire rotation information regarding the respective wheels of a four-wheel vehicle;

a wheel speed calculation step for calculating tire wheel speeds based on the rotation information detected by the rotation information detection step;

a comparison value calculation step for calculating a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value;

a determination step for determining a tire having a decreased pressure based on a relation between the first comparison value and/or the second comparison value and a predetermined determination threshold value; and an alarming step for issuing an alarm when the determination step determines a tire having a decreased pressure, wherein the method further comprises a conversion step for converting the first comparison value and the second comparison value to a plane for which change amounts of the first comparison value and the second comparison value due to a decreased pressure from the normal value learnt during a time of a normal pressure are unified between front wheels and rear wheels, and the determination step performs a decreased pressure determination by a single determination threshold value.

5. The method of detecting a decrease in a tire air pressure according to claim 4, wherein, in the two-dimensional plane in which the first comparison value is taken along the horizontal axis as DEL1 and the second comparison value is taken along the vertical axis as DEL3, the conversion step subjects the calculated estimate value (DEL1, DEL3) to a linear transformation so that the values are symmetric to the respective axes, thereby eliminating the difference in the decreased pressure sensitivity between the front wheels and the rear wheels.

6. The method of detecting a decrease in a tire air pressure according to claim 5, wherein the conversion step obtains a corrected estimate value by multiplying the estimate value with a matrix for rotating the estimate value in either of a clockwise direction or a counterclockwise direction by $\pi/4$, a matrix for unifying different decreased pressure sensitivities by elongating or contracting in a horizontal axis direction and a vertical axis direction, and a matrix for rotating the estimate value in the other direction of a clockwise direction or a counterclockwise direction by $\pi/4$.

7. A program product embodied on a computer readable medium for detecting a decrease in a tire air pressure which causes, in order to detect a tire having a decreased air pressure attached to a four-wheel vehicle, a computer to execute:

a wheel speed calculation step calculating tire wheel speeds based on rotation information detected by a rotation information detection step for periodically detecting tire rotation information regarding the respective wheels of a four-wheel vehicle;

a comparison value calculation step calculating a difference between a sum of wheel speeds of two wheels at one diagonal positions and a sum of wheel speeds of two wheels at the other diagonal positions as a first comparison value and for calculating a difference between a sum of wheel speeds of two wheels at one same side positions and a sum of wheel speeds of two wheels at the other same side positions as a second comparison value;

a determination step determining a tire having a decreased pressure based on a relation between the first comparison value and/or the second comparison value and a predetermined determination threshold value; and a conversion step converting the first comparison value and the second comparison value to a plane for which change amounts of the first comparison value and the second comparison value due to a decreased pressure from the normal value learnt during a time of a normal pressure are unified between front wheels and rear wheels, wherein the determination step performs a decreased pressure determination by a single determination threshold value.

8. The program product embodied on the computer readable medium according to claim 7, wherein, in the two-dimensional plane in which the first comparison value is taken along the horizontal axis as DEL1 and the second comparison value is taken along the vertical axis as DEL3, the conversion step subjects the calculated estimate value (DEL1, DEL3) to a linear transformation so that the values are symmetric to the respective axes, thereby eliminating the difference in the decreased pressure sensitivity between the front wheels and the rear wheels.

9. The program product embodied on the computer readable medium according to claim 8, wherein the conversion step obtains a corrected estimate value by multiplying the estimate value with a matrix for rotating the estimate value in either of a clockwise direction or a counterclockwise direction by $\pi/4$, a matrix for unifying different decreased pressure sensitivities by elongating or contracting in a horizontal axis direction and a vertical axis direction, and a matrix for rotating the estimate value in the other direction of a clockwise direction or a counterclockwise direction by $\pi/4$.

* * * * *